United States Patent [19]
Kemp

[11] 3,945,890
[45] Mar. 23, 1976

[54] CONVERTER SYSTEM

[76] Inventor: Klaus M. Kemp, 2410 Anacapa St., Santa Barbara, Calif. 93105

[22] Filed: July 26, 1974

[21] Appl. No.: 492,010

[52] U.S. Cl. .................. 202/84; 48/111; 201/2.5; 201/14; 201/25; 201/27; 201/32; 202/117
[51] Int. Cl.²... C10B 1/06; C10B 7/06; C10B 27/00
[58] Field of Search ............ 201/2.5, 32, 13, 14, 25, 201/27, 44, 10, 35; 202/84, 222, 223, 224, 117; 48/209, 111; 208/8, 11

[56] References Cited
UNITED STATES PATENTS

| | | | |
|---|---|---|---|
| 1,317,514 | 9/1919 | McCaskell | 201/32 X |
| 1,441,542 | 1/1923 | Straight | 201/32 X |
| 1,898,326 | 2/1933 | Wahlstrom | 201/2.5 X |
| 3,117,922 | 1/1964 | Leary et al. | 208/11 |
| 3,434,933 | 3/1969 | Mansfield | 201/32 |
| 3,475,279 | 10/1969 | Bowman | 202/117 X |
| 3,560,347 | 2/1971 | Knapp et al. | 201/2.5 X |
| 3,639,111 | 2/1972 | Brink et al. | 48/209 X |
| 3,668,077 | 6/1972 | Ban | 201/32 X |
| 3,843,457 | 10/1974 | Grannen et al. | 201/2.5 |
| 3,853,498 | 12/1974 | Bailie | 48/111 X |

Primary Examiner—Morris O. Wolk
Assistant Examiner—Bradley R. Garris
Attorney, Agent, or Firm—Ralph B. Pastoriza

[57] ABSTRACT

Organic and pseudo-organic materials, such as waste materials, for example, are processed in a converter system and decomposed into various usable and reusable forms. Inorganic metals and salts are treated likewise in the same converter system and processed into various usable and reusable forms. While being carried by a conveyor through a controlled atmosphere treatment chamber, virtually free from combustion supporting air or other oxidizing agents, the feed material is caused to progressively thermally break down into its more basic constituents which flow out of the material treatment chamber in a continuous liquid and gaseous vapor stream. Negative pressure is applied upstream from the material treatment chamber to lead the liquid and gaseous vapor stream through successive processing stages of collection containers, condensers and gas scrubbers. The variable negative pressure is sufficient to maintain the pressure in the material treatment chamber within a range of slightly above ambient pressure. Decomposed matter entrained in and constituted by the liquid and gaseous vapor stream is continuously recovered for use and reuse while being cycled through the converter system.

5 Claims, 3 Drawing Figures

CONVERTER SYSTEM

BACKGROUND OF THE INVENTION

This invention relates generally to materials handling and waste handling, and more specifically to the heat treatment of any decomposable materials and the procedures and equipment for treating them. Various organic, pseudo-organic, and inorganic metals and salts including waste, refuse, garbage and the like are converted into usable, recoverable and reusable products. This accomplishes total resource recovery, resource conservation and pollution free disposal.

Numerous and various types of waste treatment facilities and systems serving both private and community demands have been proposed over recent years, aimed at disposing of waste products without unduly contaminating the environment.

Modern waste conversion systems with expanded capabilities are needed to more quickly and efficiently handle and convert greater quantities of waste materials produced into usable products.

Most prior art waste handling systems are restricted by various drawbacks such as complexity, pollution problems, excessive operation, maintenance, and capital cost, inadequate capacity and capability, etc.

Many present day systems are as ineffective as they are ancient, such as open burning dumps, incinerator processes and sanitary land fill methods. It is also a known procedure to treat waaste material having a high organic content under a relatively high pressure process of destructive distillation in order to thermally decompose the organic waste material. Generally this treatment involves heating the various substances to at least their boiling points and causing the resulting gases, mists and other fluids to move by high pressure blowers and pumps to collection areas. The resulting fluids are then processed at elevated pressures, elevated temperatures or under vacuum conditions to cause further separation.

SUMMARY OF THE INVENTION

Briefly stated, this invention comprehends a materials and waste converter system and process for converting organic and psuedo-organic materials as well as some inorganic metals and salts into usable, recoverable and reusable form.

The converter system includes an elongated housing defining a longitudinally extending material treatment chamber and has an entrance end and an exit end. A continuous conveyor carries organic, psuedo-organic, inorganic metals and salts and waste materials through the material treatment chamber and extends between the housing entrance and exit ends. A drive means is coupled to the continuous conveyor for moving it through the material treatment chamber.

A radiant heating means is disposed in the housing and arranged in heat exchange relationship with the conveyor in order to cause decomposition by thermal breakdown of the materials traveling on the conveyor. A loading means is located externally of the housing entrance end for feeding the material onto the conveyor.

A plurality of sequentially aligned take-off tubes extend from the material treatment chamber and into corresponding collection containers where cooling or chilling of the decomposition materials is accomplished to create some condensates. The collection containers serve to collect a portion of the decomposed products created by thermal breakdown of the organic, pseudo-organic and inorganic materials. An elongated manifold arranged in fluid communication with top portions of the collection containers is positioned to accept gaseous vapor streams that are led from the collection containers by the Booster Pump.

A secondary condenser is arranged in fluid communication with a downstream section of the manifold in order to accept the gaseous vapor stream from the manifold. The condenser then chills gases and vapors and collects the resulting condensation.

Gas scrubber means is placed in communication with the secondary condenser for removing fluid and particulate matter from the gaseous vapor stream.

A Booster Pump generates a negative pressure and is positioned downstream of and in fluid communication with the gas scrubber means. The negative pressure generated applies a vacuum force sufficiently upstream to draw the gaseous vapor stream from the material treatment chamber and causes the various liquids, gases and vapors to flow along a tortuous path that eventually passes through the gas scrubber means. The flow during this phase is driven by the negative pressure of the Booster Pump and gravity flow is not relied upon. A regulator means is operatively coupled to the Booster Pump for maintaining pressure in the material treatment chamber within a range slightly above ambient pressure.

An accumulator is located externally of the housing exit end for accumulating processed solid material which may be cooled, removed and separated in a continuous process.

In accordance with one embodiment of this invention, a heat transfer barrier divides the housing into a relatively upper space constituting a heat generating chamber or chambers and a relatively lower space constituting the material treatment chamber. Heat from the heat generating chamber or chambers that is absorbed by the heat transfer barrier, is transmitted by radiation into the material treatment chamber. The heating means may include a plurality of burner units extending into the combustion chamber. Alternatively, the heating means may include a plurality of "fire tubes" extending directly into the processing or treatment chamber. An air-fuel supply distributes air-fuel charges to the burner units as the material treatment chamber is kept substantially free from air and other oxidizing agents in order to prevent combustion. A return line is provided to deliver substantially clean combustible gas from the Booster Pump into the combustion chamber in order to augment the air-fuel supply in those instances where gas heating is employed. Otherwise the gas is stored for various other uses.

A bottom section of the material treatment chamber is formed with a plurality of conically shaped troughs or sloping intersecting planes that are arranged to guide decomposed products created by thermal breakdown into corresponding take-off tubes.

The conveyor is preferably an endless conveyor with an upper flight that travels through the material treatment chamber in close proximity to the heating means and a lower flight that travels beneath the material treatment chamber. Alternatively, the lower flight may be fully enclosed within the elongated housing or retort and return by way of an internal tunnel.

The conveyor may be constructed from a woven mesh stainless steel alloyed wire belt having a balanced weave and porosity sized sufficiently to contain or hold particles of predetermined size while permitting fluid and small particles less than a predetermined size to flow freely and downwardly therethrough.

Gas scrubber means includes multiple serially aligned gas scrubbers for adsorbing, absorbing and otherwise eliminating certain matter entrained in and formed by the gaseous vapor stream flowing from the condenser. A first gas scrubber may remove matter by absorptive material including excelsior. A second gas scrubber may remove matter by adsorptive material including, but not limited to activated carbon.

From a process standpoint, this invention may be practiced by conveying organic, pseudo-organic, and inorganic materials through a material treatment chamber and heating the materials to progressively cause decomposition by thermal breakdown. A material, such as waste material for example, is simultaneously converted into liquid, vapor, gaseous and solid constituents and phases.

The pressure within the material treatment chamber is maintained within a range slightly above ambient. A negative pressure is continuously applied to draw a liquid, gaseous and vapor stream from the material treatment chamber and causes it to carry entrained particles and other matter through a predetermined tortuous flow path. During this process, liquids created by thermal breakdown are collected and recovered for use and reuse. Gases and vapors in the gaseous-vapor stream are condensed and recovered for use and reuse. Some particulate matter is removed from the gaseous-vapor stream and organic, pseudo-organic and inorganic materials exiting the material treatment chamber are accumulated, cooled and separated in a continuous process.

Preferably this process is carried out by heating the organic, pseudo-organic and inorganic materials with radiant heat and substantially preventing these materials from being exposed to air and other oxidizing agents during heating.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figures 1, 2:
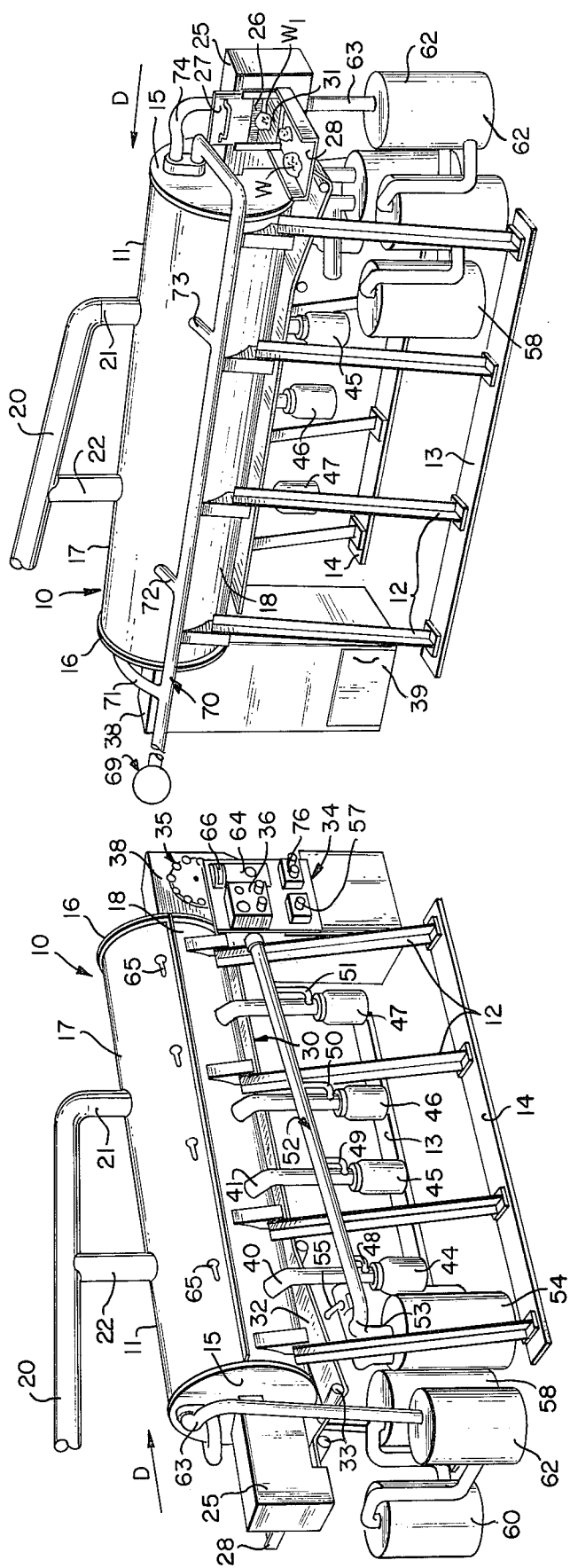
FIG. 1 is a perspective view showing one side of a waste converter system constructed in accordance with this invention.
FIG. 2 is a perspective view from the opposite side of the same waste converter system shown in FIG. 1; and, FIG. 3 is a side elevational, longitudinally sectional, partially schematic and fragmentary view of a waste converter system constructed in accordance with this invention.

Referring primarily to FIGS. 1 and 2, a material converter system 10 is shown constructed in accordance with this invention for generally continuously handling and treating organic, pseudo-organic and inorganic material, such as waste products, for example, and converting the vast majority of it into usable and reusable forms. This is an exemplary apparatus to illustrate one way in which the invention may be practiced with respect to waste materials.

The waste converter system 10 includes an elongated retort or housing 11 of general cylindrical or any other suitable configuration that is held elevated by a plurality of struts 12 resting on and supported by base beams 13 and 14.

Housing 11 is essentially a large retort with an entrance end 15 and an exit end 16. Housing 11 has an upper longitudinally extending section 17 that embodies a heating means which shall be subsequently described and a lower longitudinally extending section 18 which defined a material treatment chamber.

An exhaust duct 20 is secured to discharge ports formed in the housing upper sections 17. Exhaust gases may be discharged eventually through the exhaust stacks or branch lines 21 and 22. The hot gases may thereafter be used in other phases of the operation where heat is needed, such as in pre-drying and fluid movement control.

Coupled to the housing entrance 15 is a feed box 25 formed with an entrance 26 that may be selectively opened and closed in a suitable manner such as by way of a slide door 27, as shown. Alternatively, an airlock may be employed to assist in continuous processing. Extending from a side of the feed box 25 and aligned with entrance 26 is a loading tray 28 along which feed stock W may be slid and eventually introduced through the entrance 26. The feed stock W may be a broad variety of material including waste material, refuse, gargage, rubbish and the like, characterized by a high organic or carbon content but not limited to just organic materials.

An endless conveyor 30 has an upper flight 31 which generally travels through the housing lower section 18 and the feed box 25 and a lower flight 32 which travels generally beneath and externally of housing 11. The lower flight 32 may alternatively travel within the housing lower section 18 by way of a tunnel beneath the upper flight 31. The conveyor 30 is constructed from a stainless steel alloyed wire belt that has a woven mesh and balanced weave. In addition the porosity of the belt is sized to hold particles of a predetermined size while permitting smaller particles and fluids to flow freely downwardly therethrough. FFeed stock $W_1$ delivered onto the conveyor 30 is carried into the material treatment chamber defined by the lower housing section 18.

The drive means 35 is linked through a gear system to endless conveyor 30 whose optimum rate of travel may be regulated by a variable speed control 36 on a control panel 34.

The direction of travel of the feed stock or material W and endless conveyor 30 through the housing 11 is indicated by directional arrow D.

Coupled to the housing exit end 16 is a hopper 38 which accumulates solid stock residue $W_4$ that has been thoroughly processed within the material treatment chamber. A door 39 may be operated to periodically dispose of this solid waste stock $W_4$. An airlock may be coupled to the hopper 38 instead of the door 39 in order to facilitate continuous processing.

As the stock W is carried by conveyor 30 through the housing 11, it passes a number of sequentially aligned take-off tubes 40, 41, 42 and 43, each of which is arranged in fluid communication with collection containers 44, 45, 46 and 47 respectively. These collection containers collectively serve as a primary or initial condensing stage. The decomposed materials are cooled or chilled within the collection containers to create condensates. A plurality of take-off lines, 48, 49, 50 and 51 associated with corresponding collection containers 44, 45, 46 and 47 are in fluid communication with an elongated manifold pipe 52. The manifold pipe 52 is inclined or sloped downwardly from housing end 16 to housing end 15, so that liquids may be drained and gases may be directed towards the exit end 53 of the manifold pipe 52.

Fluid and vapor contents pass from the manifold pipe 52 into a condenser 54 where some segment of the vapor and gas is condensed within and held by condenser 54.

A booster pump regulator valve 55 is positioned on a flow line feeding from the condenser 54. A booster pump control 57 is positioned on the control panel 34 and operates independently of valve 55.

Aligned serially with condenser 54 is a first gas scrubber 58, a second gas scrubber 60 and a booster pump 62. A return line 63 is shown extending between the booster pump 62 and the housing upper section 17 for delivering the usable combustible gases to the combustion chamber. Alternatively, in instances where there is no gas burning function in conveyor system 10, these gases may be led from booster pump 62 to a suitable collection receptacle.

A temperature monitoring and control device 64 is thermally coupled to the upper housing section 17 by way of a plurality of temperature sensors 65. The particular temperature at the stages or zones associated with the temperature sensors 65 may be selectively indicated on the temperature read-out 66. An air-fuel source 69, shown schematically, is coupled to an air-fuel supply line 70 from which inlet branches 71, 72, 73 and 74 extend into the upper housing section 17. One inlet branch 71 projects into housing end 16, inlet branches 72 and 73 project into intermediate regions of housing 11 and inlet branch 74 projects into housing end 15.

An air-fuel control 76 positioned on the control panel 34, may be manipulated to selectively vary the mixing ratio, mass flow rate, velocity and other parameters to achieve optimum performance.

Figure 3:
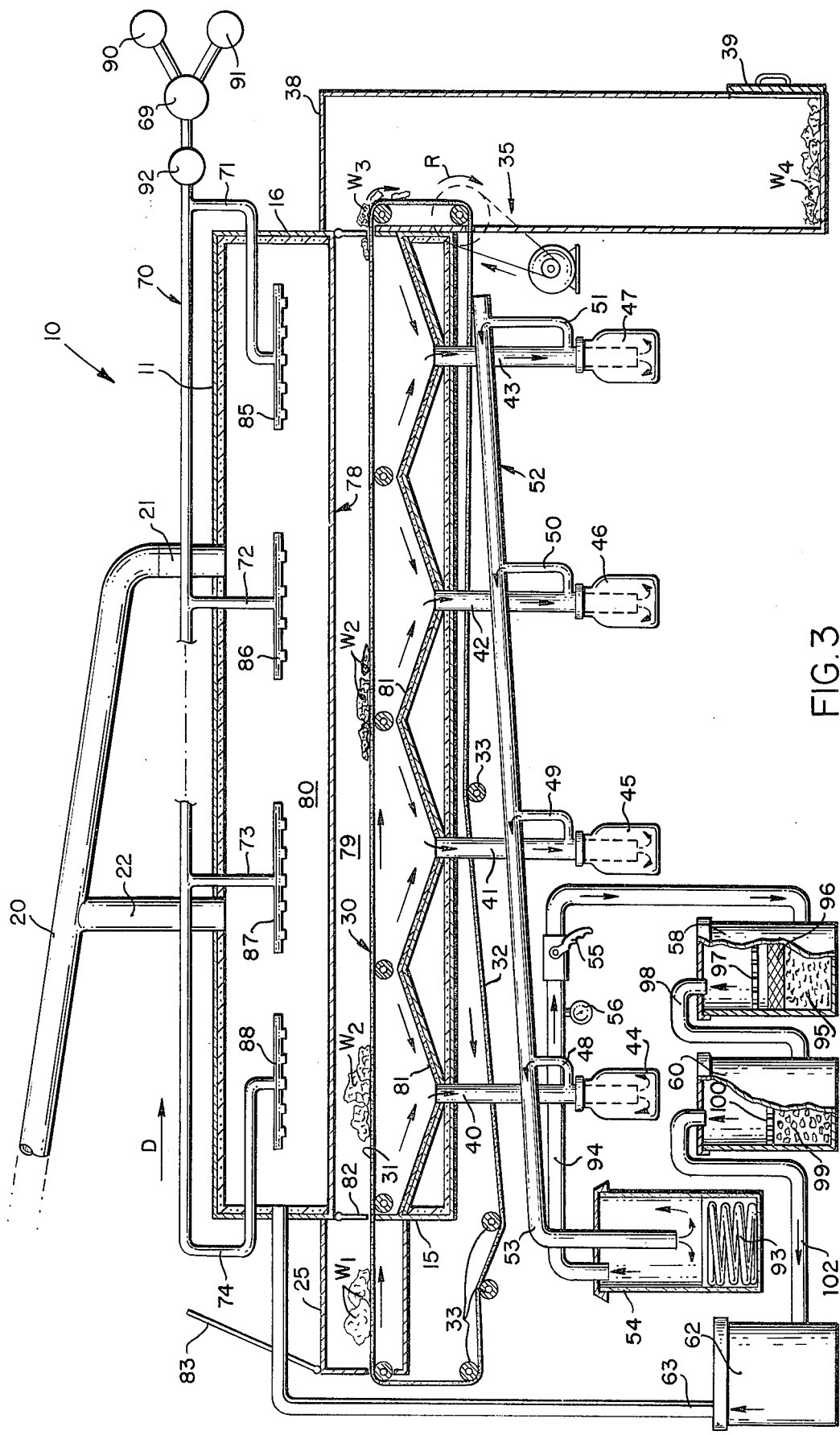

Referring now primarily to FIG. 3, a longitudinally oriented heat exchange barrier 78 extends entirely through the housing 11. Barrier 78 divides housing 11 into an overlying combustion chamber 80 and an underlying material treatment chamber 79. The material treatment chamber 79, with the aid of barrier 78, is generally hermetically sealed to block out ambient air and any other oxidizing agents.

Disposed beneath barrier 78 and also conveyor upper flight 31 are a plurality of generally conical or funnel-shaped troughs 81. These troughs 81 are arranged in side-by-side relationship at sequential stages or phases within the material treatment chamber 79. The housing entrance end 15 has an airlock mechanism 82, shown schematically. Feed box 25 is shown with a top-loading door 83 instead of a side-loading door as shown in connection with FIG. 2.

Disposed within the combustion chamber 80 are a plurality of heating units 85, 86, 87 and 88 arranged in fluid communication with the air-fuel inlet branches 71, 72, 73 and 74 respectively. These heating units are, for purposes of illustration, equipped with nozzles to substantially regulate and distribute air-fuel charges into the combustion chamber 80 so that the heating will be substantially regulated throughout.

A fuel supply source 90 and an oxidizer supply source 91 feed these ingredients into the air-fuel source 69 where they are sufficiently commingled and then channeled through a pump 92 which distributes the air-fuel mixture through supply line 70. Heat generated in the combustion chamber 80 is transferred through barrier 78 and radiated into the underlying material treatment chamber 79. Exposed to intense radiant heat, the material $W_2$ traveling on conveyor 30 commences to experience thermal breakdown and conversion into its more basic elements and compounds. Continuous subjection to high thermal energy levels causes progressive thermal breakdown as the material $W_2$ is carried through the chamber 79. Throughout this conversion process, the environment within material chamber 79 is maintained at a pressure slightly above ambient or atmospheric pressure in a manner that shall be subsequently explained.

The gaseous, vapor, liquid and particulate products created within the material treatment chamber 79 tumble or are drawn into the troughs 81 and caused to successively enter the takeoff tubes 40, 41, 42 and 43. Liquids are collected within the containers 44, 45, 46 and 47. Gaseous and vapor products flow through takeoff tubes 48, 49, 50 and 51 into the manifold 52 and eventually enter the condenser 54. Chilling or refrigeration equipment, symbolized by refrigeration coil 93, causes additional gaseous and vapor product to condense and accumulate in the condenser 54. Uncondensed fluids egress through flow line 94 which mounts the booster pump regulating valve 55 and an adjacent regulator guage 56. This product enters the base of a first gas scrubber 58 and is distributed throughout a mass of high adsorptive material 95. Material 95 may, for example, consist of coarse elements such as excelsior, i.e., dry wood, shavings and ribbons, and/or plastic scraps. A porous partition 96 such as cheesecloth rests on the adsorptive material 95 and a metal hold down grid 97 is positioned on partition 96.

The balance of the gaseous and vapor product with entrained matter moves upwardly and is led through flow line 98 to the base of a second gas scrubber 60. The gaseous and vapor product is distributed throughout a mass of highly absorptive material 99 such as activated carbon. Another substantial amount of particulte matter is removed through absorption. A holddown grid 100 rests on the absorptive material 99.

The balance of the gaseous and vapor product, now substantially cleansed and purified of particulate matter is led through flow line 102 and is drawn into the booster pump 62. The resulting gaseous-vapor stream of combustible fluid is sent through return line 63 into the combustion chamber 80 in order to augment the combustion ingredients.

OPERATION

Keeping the above construction and process in mind it can be understood how many of the previously described disadvantages of conventional material and waste treatment techniques are overcome or substantially elminated by this invention.

As a preliminary operation before being processed in the converter system 10 of this invention, the material W or feed stock may optionally be sorted, shredded, disintegrated, dried and otherwise prepared for subsequent handling.

The material W may be characterized by various common products such as, but not limited to: wood products including paper, cardboard, hedge and tree trimmings, milk cartons, etc; plastic products including automobile tires, garden hose, plastic containers, wrappers, etc.; household wastes and garbage; hospital waste; agricultural wastes; petroleum wastes; sewage, sludge and industrial wastes. This invention treats natural and man-made decomposable materials for producing a variety of usable products.

Oxidizer, such as air, and fuel, such as natural gas, are driven through the air-fuel supply 70 and caused to enter combustion chamber 80 by way of burner units 85, 86, 87 and 88. This heat may optionally be generated by way of electricity, oil or any other suitable energy that may be converted or transformed into radiant heat. The selected material W is delivered through feed box 25. The material $W_1$, deposited on endless conveyor 30, is carried forwardly through the airlock entrance 82 which is structured to prevent ambient air, except for a very small portion, from entering the combustion chamber 80.

The material $W_2$ is then subjected to regulated radiant heat transmitted through the barrier 78. Throughout its journey within the material treatment chamber 79, the material $W_2$ is caused to decompose by way of thermal breakdown without air or any oxidizing agents, except in inconsequential amounts, being present. The decomposing action penetrates deeper through the material $W_2$ as it is conveyed along the predetermined path as indicated by directional arrow D.

Conveyor 30 is constructed from woven mesh belt stock as previously described so as to contain and hold very small particulate matter of a predetermined size while allowing gases, vapors and liquids created by thermal breakdown to fall into the troughs 81 and become guided at different stages into the takeoff tubes 40, 41, 42 and 43.

The general flow from the material treatment chamber 79 is laden with various decomposed or converted products in various forms, i.e., gas, vapor, liquid, particulate matter, aggregations and conglomerations.

The decomposed product in various states is borne by a general gaseous-vapor stream originating in the material treatment chamber 79 and which is temporarily split into several streams passing through the takeoff lines 40, 41, 42 and 43. The gaseous-vapor stream entrains and carries these products through a tortuous predetermined flow path during which certain products are constantly removed, all for recovery use and reuse as the stream is simultaneously being cleaned and purified.

The negative pressure exerted by booster pump 62 is sufficient to pull the gaseous-vapor stream from the material treatment chamber 79 and then successively through the manifold pipe 52, condenser 54, scrubber 58, scrubber 60 and any subsequent scrubbers that may optionally be included in the converter system 10.

Through the vacuum force as adjusted and regulated by the booster pump regulating valve 55, the pressure within the material treatment chamber 79 is kept within a preferred range above ambient pressure which is the ideal operating condition. The booster pump control 57 governs the extent of the negative pressure exerted. Regulator valve 55 selectively varies or adjusts the negative pressure applied upstream into the material treatment chamber 79.

All of the decomposed products are recovered or reclaimed at various stages for further use, refining and reuse. Thus, the converter system 10 operates as a total resource recovery system. Solid material $W_3$ is delivered by the conveyor 30 to a bin or accumulator 38 so that some portion of the accumulated solid material $W_4$ is in the form of carbons and char. Decomposed matter in liquid form, collected in containers 44, 45, 46 and 47 and in the condenser 54 may be various chemicals, oils, and tars capable of being refined into other products. Substantially purified and cleaned combustible gas egressing the booster pump 62 is boosted through return line 63 into the combustion chamber 80 in order to augment the primary fuel source. The heat discharged from combustion chamber 80 through the exhaust duct 20 may be used for drying and other processes.

By way of illustration, some of the particular chemicals and compounds that may be recovered for reuse are; acids, alcohols, aldehydes, benzols, cresols, ketones, oils, phenols, ammonias and oleoresins, hydrocarbons, tars, and terpenes.

Some of the inorganic materials treated for soft metals, such as lead, zinc and antimony. An example of a pseudo-organic material treated is silicone.

From the foregoing it will be evident that the present invention has provided a conversion system and process in which all of the various advantages are fully realized.

What is claimed is:

1. A converter system comprising:
   a. an elongated housing defining a longitudinally extending material treatment chamber, having an entrance end and an exit end;
   b. an endless conveyor for carrying organic, pseudo-organic and inorganic material through the material treatment chamber and extending between the housing entrance end and exit end, the conveyor having an upper flight that travels through the material treatment chamber and a lower flight that travels beneath the material treatment chamber;
   c. drive means coupled to the conveyor for moving the conveyor through the material treatment chamber of the housing;
   d. heating means in the housing arranged in heat exchange relationship with the conveyor to cause decomposition by thermal breakdown of material being carried by the conveyor;
   e. loading means located externally of the housing entrance end for feeding material onto the conveyor;
   f. multiple sequentially aligned take-off tubes depending from the housing material treatment chamber and into corresponding collection containers for collecting liquid, gaseous and vapor streams of decomposed product created by thermal decomposition of the material;
   g. a bottom portion of the material treatment chamber formed with a plurality of conically shaped troughs arranged to guide decomposed product created by thermal decomposition into corresponding take-off tubes;
   h. an elongated manifold in fluid communication with top portions of the collection containers and arranged to accept fluid (gases and vapors) streams led from the collection containers;
   i. a condenser arranged and constructed in fluid communication with the manifold to accept the fluid (gases and vapors) stream from the manifold, to chill the fluids and collect resulting condensation;

j. gas scrubber means in communication with the condenser for removing entrained particulate matter from the fluid (gases and vapors) stream, the gas scrubber means including multiple serially aligned gas scrubbers for absorbing, adsorbing and eliminating particulate matter entrained in the fluid (gases and vapors) stream led from the condenser;

k. booster pump means positioned downstream of and in fluid communication with the gas scrubber means, the booster pump means being arranged and constructed to apply negative pressure sufficiently upstream to draw the fluid (gases and vapor) stream from the material treatment chamber and along a tortuous flow path eventually passing through the gas scrubber means;

l. regulator means operatively coupled to the booster pump means for maintaining pressure in the material treatment chamber within a range slightly above ambient pressure; and, m. an accumulator located externally of the housing exit end for accumulating processed solid material, and cooling, sorting, and continuously conveying away the material.

2. The system according to claim 1 including:
an exhaust duct extending from the upper portion of the combustion chamber, the duct being arranged to furnish heat to other phases of the system.

3. The system according to claim 1 wherein said gas scrubber means consists of:
a first gas scrubber means, for removing matter by absorptive material; and, a second gas scrubber means for removing matter by adsorptive material.

4. The system according to claim 1 wherein:
absorptive material in the first gas scrubber means includes excelsior.

5. The system according to claim 1 wherein;
the heating means includes a plurality of burner units;
a heat transfer barrier is arranged to divide the housing into a relatively upper space constituting a combustion chamber and a relatively lower space constituting the material treatment chamber;
an air-fuel supply is provided for distributing air-fuel charges to the burner units;
a return line is provided for delivering substantially clean combustible fluids from the booster pump means to the combustion chamber to augment the air-fuel supply; and,
the material treatment chamber is kept substantially free of air and any other oxidizing agents to prevent combustion of the material therein.

* * * * *